United States Patent [19]

Maekawa et al.

[11] Patent Number: 5,276,822
[45] Date of Patent: Jan. 4, 1994

[54] SYSTEM WITH ENHANCED EXECUTION OF ADDRESS-CONFLICTING INSTRUCTIONS USING IMMEDIATE DATA LATCH FOR HOLDING IMMEDIATE DATA OF A PRECEDING INSTRUCTION

[75] Inventors: Hidetsugu Maekawa; Takashi Koizumi, both of Osaka, Japan

[73] Assignee: Matsushita Electric Industrial Co., Ltd., Osaka, Japan

[21] Appl. No.: 612,731

[22] Filed: Nov. 14, 1990

[30] Foreign Application Priority Data

Nov. 15, 1989 [JP] Japan .................. 1-298459

[51] Int. Cl.⁵ .................. G06F 9/38; G06F 9/26; G06F 9/28
[52] U.S. Cl. .................. 395/375; 364/231.8; 364/263; 364/263.1; 364/263.2; 364/262.4; 364/271.6; 364/DIG. 1
[58] Field of Search .................. 395/375, 800, 400

[56] References Cited

U.S. PATENT DOCUMENTS

| | | | |
|---|---|---|---|
| 4,916,606 | 4/1990 | Yamaoka et al. | 395/375 |
| 5,075,849 | 12/1991 | Kuriyama et al. | 395/400 |
| 5,127,093 | 6/1992 | Moore, Jr. | 395/375 |
| 5,136,696 | 8/1992 | Beckwith et al. | 395/375 |
| 5,179,697 | 1/1993 | Nishii et al. | 395/575 |

Primary Examiner—Robert B. Harrell
Assistant Examiner—Meng-Ai T. An
Attorney, Agent, or Firm—Lowe, Price, LeBlanc & Becker

[57] ABSTRACT

An information processor includes an immediate data latch and a pair of multiplexers in an input portion of an adder in a data address generator. The structure controls operation of the multiplexer in accordance with a register conflict detecting control signal and eliminates an idle state of a pipeline by detecting a register conflict between a register for holding immediate data, indicated by a precedent instruction instructing a specific register to store the immediate data, and a register used for calculation of memory addresses to be used for execution of a succeeding load/store instruction. The immediate data latch directly latches an immediate data indicated by the precedent instruction and outputted by an instruction decoding portion. Then, if the register conflict detecting portion detects the register conflict, the immediate data latched by the immediate data latch is used for calculation of memory addresses. This control operation is performed by changing the multiplexer according to the register conflict control signal to input the data from the immediate data latch to the adder.

4 Claims, 12 Drawing Sheets

SYSTEM WITH ENHANCED EXECUTION OF ADDRESS-CONFLICTING INSTRUCTIONS USING IMMEDIATE DATA LATCH FOR HOLDING IMMEDIATE DATA OF A PRECEDING INSTRUCTION

BACKGROUND OF THE INVENTION

1. Field of The Invention

This invention relates to an information processor employing an electronic computer.

2. Description of The Related Art

Referring first to FIG. 5, there is shown a conventional information processor. In this figure, reference numeral 101 represents an instruction decoding portion; 102 a register conflict detecting portion for detecting a phenomenon referred to as "register conflict" (to be described later) occurring between two registers respectively used by two instructions to consecutively be executed; 103 a register portion comprised of a plurality of registers including "0 register" which holds 32-bit data representing 0 (hereunder referred to as zero data); 104 an integer arithmetic portion which includes an arithmetic and logical unit (ALU); 105 a data transfer control portion for controlling transfer of data between the register portion 103 and data cache (not shown); 501 a data address generating portion for generating data addresses; 110 an instruction bus for transmitting instructions; 111 an immediate data bus for transmitting 32-bit immediate data; 112 a first internal data bus for transmitting 32-bit internal data; 113 a second internal data bus for transmitting 32-bit internal data; 114 a third internal data bus for transmitting 32-bit internal data; 115 a data address bus for transmitting 32-bit data addresses; 116 a store data bus for transferring 32-bit data to be stored in the data cache from the register portion 103 to the data cache; 117 a load data bus for transferring 32-bit data to be loaded from the data cache to the register portion 103; and 118 control signals sent from the instruction decoding portion 101 to the data address generating portion 501.

FIG. 6 is a schematic block diagram for showing internal structure of the data address generating portion 501 of the conventional information processor of FIG. 5. In FIG. 6, reference numerals 203 and 601 designate 32-bit multiplexers; 202 a 32-bit adder; and 204 a 32-bit feed back latch. Further, reference numerals 111, 112 and 113 denote the 32-bit immediate data bus, the 32-bit first internal data bus and the 32-bit second internal data bus illustrated in FIG. 5, respectively. Moreover, reference numeral 210 indicates a data bus for transferring 32-bit data outputted from the multiplexer 601 to the adder 202; and 211 an addition result output bus for transmitting an output of the adder 202. Furthermore, reference numeral 115 represents the data address bus illustrated in FIG. 5. Further, reference numeral 212 represents a held data bus for transmitting data which is outputted to the data address bus 115 one clock cycle ago and then is held by the feed back latch 204; 213 a data selection signal, which is a part of the control signals 118 of FIG. 5, indicating a selection condition to be used in the multiplexer 601; and 214 an address holding signal, which is also a part of the control signal 118 of FIG. 5, indicating a selection condition to be used in the multiplexer 203.

Hereinafter, an operation of the conventional information processor constructed as above described will be explained.

This conventional information processor is a pipeline consisting of four stages. Further, in this conventional information processor, an operation is effected on only data stored in two 32-bit registers. Then, the results of the operation is stored again in the register. Furthermore, in this conventional information processor, data is transferred from (or to) a memory only to (or from) the registers. Additionally, this conventional information processor employs "load and store" architecture.

FIG. 7 is a timing chart for illustrating a manner of processing operation instructions of this conventional information processor. In this figure, reference characters C1, C2 . . . represent processing cycles; and A and B operation instructions to be processed.

First, the manner of processing operation instructions in this conventional information processor will be described hereinbelow by referring to FIGS. 5 and 7.

In C1 Cycle, an operation instruction A is fetched and is sent to an instruction bus 110.

Further, in C2 Cycle, the operation instruction A sent to the instruction bus 110 is decoded by the instruction decoding portion 101. The instruction decoding portion 101 sends out a control signal 118 representing control information corresponding to the decoded instruction.

Then, the information processor performs the following two kinds of processing according to kinds of the operation instruction A.

(1) In case where the operation instruction A directs the information processor to perform an operation on data stored in two 32-bit registers, a register portion 103 sends out two kinds of data respectively stored in the two 32-bit registers, which are indicated by the control signal 118, to the first internal data bus 112 and the second internal data bus 113, respectively.

(2) On the other hand, in case where the operation instruction A directs the information processor to set immediate data indicated by the instruction A in a specific register, the instruction decoding portion 101 sends out the immediate data to the immediate data bus 111. Further, the register portion 103 sends out data 0 stored in the 32-bit "0 register" indicated by the control signal 118 to the first internal data bus 112. Moreover, an operation instruction B is fetched and is sent to the instruction bus 110.

Next, in C3 Cycle, the integer arithmetic portion 104 carries out an operation indicated by the control signal 118 which is issued by the instruction decoding portion 101 in C2 Cycle. At that time, there are two kinds of data, which respectively corresponding to the two cases (1) and (2) in C2 Cycle, to be used in this operation.

(1) In case where the operation instruction A directs the information processor to perform an operation on data stored in the two 32-bit registers, data, which is sent from the register portion 103 to the first internal data 112 and the second internal data bus 113 in C2 Cycle, is inputted to the integer arithmetic portion 104 and performs an operation on the input data. After the operation is finished, results of the operation are sent to the 32-bit third internal data bus 114.

(2) In case where the operation instruction A directs the information processor to set immediate data indicated by the instruction A in the specific register, the immediate data sent by the instruction decoding portion 101 to the immediate data bus 111 is inputted to the integer arithmetic portion 104, and further performs an addition of the input data and 0 sent by the register portion 103. Upon completion of this operation, results of this operation is sent to the 32-bit third internal data bus 114.

Incidentally, the operation instruction B is processed in the same manner as in case of the operation instruction A in C2 Cycle. Thus, a detailed description of the processing of the operation instruction B is omitted.

Further, in C4 Cycle, the register portion 103 stores the data, which is sent by the integer arithmetic portion 104 to the third internal data bus 114, in the register indicated by the control signal 118 in C2 Cycle.

Incidentally, in this cycle, the operation instruction B is processed in the same manner as in case of the operation instruction A in C3 Cycle. Thus, a detailed description of the processing of the operation instruction B is omitted.

Next, the manner of processing an operation instruction, which requires calculation of addresses (hereunder sometimes referred to as memory addresses) of a memory, in this conventional information processor will be described hereinbelow. By way of example, the manner of processing a store instruction for storing data, which is held in a register, in a memory of the conventional information processor.

FIGS. 8 and 9 are timing charts for illustrating the manner of processing a store instruction for storing the data in the memory of the conventional information processor. Especially, FIG. 8 is a timing chart for the manner of processing store instruction in case where the store instruction (hereunder sometimes referred to as the "none-cycle store" instruction) directs a "one-cycle store" operation, namely, in case where data held in a 32-bit register is added to the immediate data indicated by the store instruction to calculate a memory address at which data should be stored. Further, FIG. 8 is a timing chart for illustrating the manner of processing store instruction in case where the store instruction (hereunder sometimes referred to as the "two-cycle store" instruction) directs a "two-cycle store" operation, namely, in case where data held in two 32-bit registers are added to the immediate data indicated by the store instruction to calculate a memory address at which data should be stored.

First, an "one-cycle store" operation of the conventional information processor will be described hereinafter by referring to FIGS. 5, 6 and 8. For simplicity of description, let "(r1)" denote data held in a register to be used for address calculation at the tune of effecting "one-cycle store" operation; "(immA)" immediate data; and "(r2)" data to be stored in the memory, i.e., the data cache.

In C1 Cycle, the store instruction A is fetched and is further sent to the instruction bus 110.

Further, in C2 Cycle, the store instruction A sent to the instruction bus 110 is decoded by the instruction decoding portion 101. Then, the instruction decoding portion 101 sends out the control signal 118 representing control information and also sends out the immediate data (immA) to the immediate data bus 111. Moreover, the register portion 103 sends out the data (r1) stored in the 32-bit register, which is indicated by the control signal 118 and is used for calculation of memory addresses, to the second internal data bus 113 and also sends out data (r2) held in the 32-bit register, which should be stored in the memory, to the first internal data bus 112.

Next, an operation of the data address generating portion 501 will be described hereinbelow. The multiplexer 601 outputs the immediate data (immA) of the immediate data bus 111 to the data bus 210 in accordance with information represented by the data selection signal 213 which is sent out as the control signal 118. The adder 202 adds the immediate data (immA), which is outputted to the 32-bit data bus 210, and the data (r1), which is outputted to the second internal data bus 113. Further, the adder 202 outputs results of the addition to the addition result output bus 211. The multiplexer 203 outputs the data transmitted on the addition result output bus 211 to the data address bus 115 according to information represented by the address holding signal 214 which is outputted as the control signal 118. Thus, address {(immA)+(r1)} at which data should be stored is sent out to the data address bus 115.

In C3 Cycle, the data cache is accessed by using the address {(immA)+(r1)} sent out to the data address bus 115. Here, it is assumed that the data cache is hit. Further, the data transfer control portion 105 latches the data (r2) outputted to the first internal data bus 112.

Furthermore, in C4 Cycle, the data transfer control portion 105 outputs the data (r2) latched in C3 Cycle to the store data bus 116 and the data (r2) is stored in the cache.

Next, a "two-cycle store" operation of the conventional information processor will be described hereinafter by referring to FIGS. 5, 6 and 9. For simplicity of description, let "(r1)" and "(r2)" denote data held in registers to be used for address calculation at the time of effecting "two-cycle store" operation; and "(r3)" data, which is held in the register, to be stored in the memory, i.e., the data cache.

In C1 Cycle, the store instruction A is fetched and is further sent to the instruction bus 110.

Further, in C2 Cycle, the store instruction A sent to the instruction bus 110 is decoded by the instruction decoding portion 101. Then, the instruction decoding portion 101 sends out the control signal 118 representing control information. Moreover, the register portion 103 sends out the data (r1) and the data (r2) stored in the two 32-bit registers, which are indicated by the control signal 118 and is used for calculation of memory addresses, to the first internal data bus 112 and the second internal data bus 113, respectively.

Next, an operation of the data address generating portion 501 will be described hereinbelow. The multiplexer 601 outputs the data transmitted on the first internal data bus 112 to the data bus 210 in accordance with information represented by the data selection signal 213 which is sent out as the control signal 118. The adder 202 adds the data (r1), which is outputted to the data bus 210, and the data (r2), which is outputted to the second internal data bus 113. Further, the adder 202 outputs results of the addition to the addition result output bus 211. The multiplexer 203 outputs the data transmitted on the addition result output bus 211 to the data address bus 115 according to the information represented by the address holding signal 214 which is outputted as the control signal 118. Thus, address {(r1)+(r2)} at which data should be stored is sent out to the data address bus 115.

In C3 Cycle, the instruction decoding portion 101 outputs a control signal 118 which represents control information indicating a second cycle of the "two-cycle store" operation on the basis of the fact that the store instruction A decoded in C2 Cycle directs a "two-cycle store" operation.

Subsequently, the register portion 103 sends out the data (r3), which is held in the 32-bit register indicated by the control signal 118, to the first internal data bus 112. To keep outputting results of the addition effected in C3 Cycle to the data address bus 115 in accordance with information represented by the address holding signal 214, which is sent out as the control signal 118, the data address generating portion 501 controls the multiplexer 203 in such a manner that the data {(r1)+(r2)} transmitted on the holding data bus 212 is outputted to the data address bus 115. Further, the instruction decoding portion 101 does not decode the next instruction (see "nop" in FIG. 9) because the instruction decoded in C2 Cycle directs a "two-cycle store" operation.

Further, in C4 Cycle, the data cache is accessed by using the address {(r1)+(r2)} sent out to the data address bus 115. Here, it is assumed that the data cache is hit. Furthermore, the data transfer control portion 105 latches the data (r3) outputted to the first internal data bus 112.

Thereafter, in C5 Cycle, the data transfer control portion 105 outputs the data (r3) latched in C4 Cycle to the store data bus 116 and the data (r3) is stored in the cache.

As described above, a "two-cycle store" instruction requires data held in three registers. Thus, five cycles are needed for execution of the "two-cycle store" instruction. As a result, each time a "two-cycle store" instruction is executed, the pipeline is put into an idle state for a period of one cycle.

Next, will be described hereinbelow an operation of the conventional information processor in case where an operation instruction for setting immediate data in a specific register and another instruction requiring calculation of memory addresses are succeedingly effected and moreover a register used for the calculation of memory addresses for execution of the latter instruction is in agreement with a register in which the immediate data is set by the former operation instruction (namely, a register conflict occurs).

Here, a store instruction is cited as an example of the instruction requiring calculation of memory addresses.

FIGS. 10 and 11 are timing charts for illustrating an operation of the conventional information processor in case where an operation instruction A for setting immediate data in a specific register and a store instruction B are succeedingly effected and moreover a register used for the calculation of memory addresses for execution of the latter store instruction B is in agreement with a register in which the immediate data is set by the former operation instruction A (namely, a register conflict occurs). Especially, FIG. 10 is a timing chart for illustrating an operation in case where the store instruction B is a "one-cycle store" instruction. FIG. 11 is a timing chart for illustrating an operation in case where the store instruction B is a "two-cycle store" instruction.

By referring to FIGS. 5, 6 and 10, an operation of the conventional information processor in case where the operation instruction A for setting immediate data in a specific register and a "one-cycle store" instruction B are succeedingly effected and moreover a conflict between a register used for the calculation of memory addresses for execution of the store instruction B and a register, in which the immediate data should be set by the former operation instruction A, occurs. For simplicity of description, let "r1" denote the register coming into conflict with the register in which the immediate data should be set; "(immA)" the immediate data set by the operation instruction A; "(immB)" the immediate data to be used for calculation of addresses required by the "one-cycle store" instruction B; and "(r2)" data, which is held in the register, to be stored in the memory, i.e., the data cache.

In C1 Cycle, (1) the processing of the operation instruction A is as follows. Namely, the operation instruction A is fetched and further is sent to the instruction bus 110.

Then, in C2 Cycle, (1) the processing of the operation instruction A is as follows. Namely, the operation instruction A sent out to the instruction bus 110 is decoded by the instruction decoding portion 101. The instruction decoding portion 101 sends out the control signal 118 representing control information to the data address generating portion 501 and further outputs the immediate data (immA) to the immediate data bus 111. Moreover, the register portion 103 sends out data, which is held in the 32-bit "0 register" indicated by the control signal 118, to the first internal data bus 112.

On the other hand, (2) the processing of the store instruction B is as follows. Namely, the store instruction B is fetched and is then sent out to the instruction bus 110.

Next, in C3 Cycle, (1) the processing of the operation instruction A is as follows. Namely, the immediate data (immA), which is sent out by the instruction decoding portion 101 to the immediate data bus 111, is inputted to the integer arithmetic portion 104. Further, the integer arithmetic portion 104 performs an addition of this input data and 0 sent out by the register portion 103 to the first internal data bus 112. Upon completion of this addition, the integer arithmetic portion 104 outputs results of the addition to the 32-bit third internal data bus 114.

On the other hand, (2) the processing of the store instruction B is as follows. That is, the store instruction B sent to the instruction bus 110 is first decoded by the instruction decoding portion 101. Then, the instruction decoding portion 101 outputs the control signal 118 to the data address generating portion 501 and also outputs immediate data (immB) to the immediate data bus 111. Further, the register portion 103 sends out the data (r1), which is used for calculation of memory addresses and is held in the 32-bit register indicated by the control signal 118, to the second internal data bus 113 and also sends out the data (r2), which should be stored in a memory and is held in the 32-bit register, to the first internal data bus 112. Incidentally, the data (r1) transmitted on the second internal data bus 113 is invalid data because the execution of the operation instruction A is not completed. The register conflict detecting portion 102 performs detection of a register conflict between the register r1 used for calculation of memory addresses required for execution of the store instruction B and the register r1, in which the immediate data should be set, for the operation instruction A, which precedes the instruction B, in parallel with the above described processing of the instruction decoding portion 101. Further, the register conflict detecting portion 102 informs the instruction decoding portion 101 of results of the detection.

Furthermore, in C4 Cycle, (1) the processing of the operation instruction A is as follows. The immediate data (immA) sent out by the integer arithmetic portion 104 in C3 Cycle to the third internal data bus 114 is stored in the register r1 indicated by the control signal 118 in C2 Cycle.

Additionally, (2) the processing of the store instruction B is as follows. As the result of the fact that the register conflict detecting portion 102 detects a conflict between the register r1 used for the execution of the store instruction B and the register r1 in C3 Cycle, the instruction decoding portion 101 continues decoding the store instruction B similarly as in C3 Cycle and further sends out the control signal 118 representing control information and moreover sends out the immediate data (immB) to the immediate data bus 111. The register portion 103 sends out the data (r1), which is held in the 32-bit register used for the calculation of the memory addresses, to the second internal data bus 113 and sends out the data (r2), which should be stored in the memory and is held in the 32-bit register, to the first internal data bus 112.

Next, an operation of the data address generating portion 501 will be described.

First, the multiplexer 601 outputs the immediate data (immB) transmitted on the immediate data bus 111 to the data bus 210 in accordance with the information represented by the data selection signal 213 which is outputted as the control signal 118. The adder 202 adds the immediate data (immB) and the data (r1) respectively outputted to the 32-bit data bus 210 and the second internal data bus 113 and outputs results of the addition to the addition result output bus 211. Then, the multiplexer 203 outputs the data transmitted on the addition result output bus 211 to the data address bus 115 in accordance with information represented by the address holding signal 214 which is sent out as the control signal 18. Thus, an address {(immB)+(r1)} at which the data should be stored is sent out to the data address bus 115.

Incidentally, operations of C5 and C6 Cycles are similar to operations of C3 and C4 Cycles which are above described regarding the "one-cycle store" operation. Therefore, description of the operations of C5 and C6 Cycles is omitted (see the description of FIG. 8).

As described above, in case where a register conflict between the register r1 used for calculation of memory addresses required for execution of the "one-cycle store" instruction B and the register r1, in which the immediate data should be set for execution of the operation instruction A, the pipeline is put into an idle state for a period of one cycle. In the foregoing description, a "one-cycle store" instruction is cited as an example of an instruction requiring calculation of memory addresses. However, in case where a register conflict occurs when another load instruction or branch instruction requiring calculation of memory addresses is executed, the pipeline is also put into an idle state for a period of one cycle.

Similarly, in case where a register conflict between the register used for calculation of memory addresses required for execution of the "two-cycle store" instruction B and the register, in which the immediate data should be set for execution of the operation instruction A, the pipeline is put into an idle state for a period of two cycles. An operation of the information processor in this case is similar to the operation of the case of the "one-cycle store" instruction B except for a point that the term "one-cycle store" should be replaced with the term "two-cycle store". Thus, detailed description of the operation of the information processor in this case is omitted. For a reference, a timing chart illustrating the operation of the information processor in this case is shown in FIG. 11.

Consequently, the conventional information processor having the above described arrangement has drawbacks that the pipeline is put into an idle state for a period of one cycle in case where a register conflict between the register r1 used for calculation of memory addresses required for execution of the "one-cycle store" instruction B and the register r1, in which the immediate data should be set for execution of the operation instruction A and that the pipeline is put into an idle state for a period of two cycles in case where a register conflict between the register used for calculation of memory addresses required for execution of the "two-cycle store" instruction B and the register, in which the immediate data should be set for execution of the operation instruction A. The present invention is created to eliminate the drawbacks of the conventional information processor.

It is accordingly an object of the present invention to provide an information processor which can eliminate an idle state of the pipeline and effect data processing at a high speed.

SUMMARY OF THE INVENTION

To achieve the foregoing object and in accordance with a first aspect of the present invention, there is provided an information processor which comprises an immediate data latch for latching and holding immediate data indicated by each instruction, two multiplexers each for receiving an output of the immediate data latch, an adder for adding outputs of the two multiplexers and a register conflict detecting portion connected to the two multiplexers for detecting occurrence of a register conflict during execution of first and second instructions to be successively executed in this order and for outputting register conflict detecting signals to the multiplexers, wherein the first instruction is an instruction for storing first immediate data in a first register, and the second instruction is an instruction which requires calculation of addresses in a memory, and wherein the adder calculates the addresses, by using the first immediate data which has been latched and held by the immediate data latch and is then outputted from one of said multiplexers in response to a register conflict detecting signal, when the register conflict detecting portion detects the register conflict by determining that a second register to be used for the calculation of addresses required by the second instruction is the first register in which the first immediate data is stored.

Further, in accordance with a second aspect of the present invention, there is provided an information processor which comprises an immediate data latch for latching and holding immediate data indicated by each instruction, two multiplexers each for receiving an output of the immediate data latch, an adder for adding outputs of the two multiplexers and a register conflict detecting portion connected to the two multiplexers for detecting occurrence of a register conflict during execution of first and second instructions to be successively executed in this order and outputting register conflict detecting signals to the multiplexers, wherein the first instruction is an instruction for storing first immediate data in a first register, and the second instruction is an instruction for calculating addresses of the memory by adding second immediate data from the second instruction and data held in a second register and storing data held in a third register at the calculated addresses of the memory, and wherein the adder calculates the addresses by adding the first immediate data, which has been latched and held by the immediate data latch and is then outputted from one of the multiplexers in response to a register conflict detecting signal, and the second immediate data from the second instruction, which is then outputted from the other of the multiplexers in response to a register conflict detecting signal, when the register conflict detecting portion detects a register conflict by determining that the second register to be used for the calculation of addresses required by the second instruction is the first register, in which the first immediate data is stored.

Furthermore, in accordance with a third aspect of the present invention, there is provided an information processor which comprises an immediate data latch for latching and holding immediate data indicated by each instruction, two multiplexers each for receiving an output of the immediate data latch, an adder for adding outputs of the two multiplexers, a register conflict detecting portion for detecting occurrence of a register conflict during execution of first and second instructions which should be successively executed and outputting register conflict detecting signals to the multiplexers when detecting occurrence of a register conflict and a register portion having a plurality of registers and being capable of simultaneously outputting data held in two registers, wherein the first instruction is an instruction for storing first immediate data in a register, and the second instruction is an instruction for calculating addresses of the memory by adding data held in a second register and data held in a third register and storing data held in a fourth register at the calculated addresses of the memory, and wherein when the register conflict detecting portion detects a register conflict by determining that one of the second and third registers to be used for the calculation of addresses required by the second instruction is the first register in which the first immediate data is stored, the register conflict detecting portion outputs the data held in either the second or third registers and the data held in the fourth register and moreover the adder calculates the addresses by adding the first immediate data, which has been latched and held by the immediate data latch and is then outputted from one of the multiplexers in response to a register conflict detecting signal, and the data held in either the second or third registers which is not the first register and is outputted from the other of the multiplexers in response to a register conflict detecting signal.

Thereby, in case where a register conflict occurs between a register to be used for execution of an instruction (e.g., a load instruction, a store instruction or a branch instruction) requiring calculation of memory addresses and a register, in which immediate data should be set, to be used for execution of an operation instruction prior to the execution of the instruction requiring calculation of memory addresses, the processing can be faster effected by a period of one clock cycle. Furthermore, in case where a register conflict occurs between a register to be used for execution of a "two-cycle store" instruction requiring calculation of memory addresses and a register, in which immediate data should be set, to be used for execution of an operation instruction prior to the execution of the "two-cycle store" instruction, the processing can be faster effected by a period of two clock cycles. Thus, the present invention is of great practical utility.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, a preferred embodiment of the present invention will be described by referring to the accompanying drawings.

Figure 1:
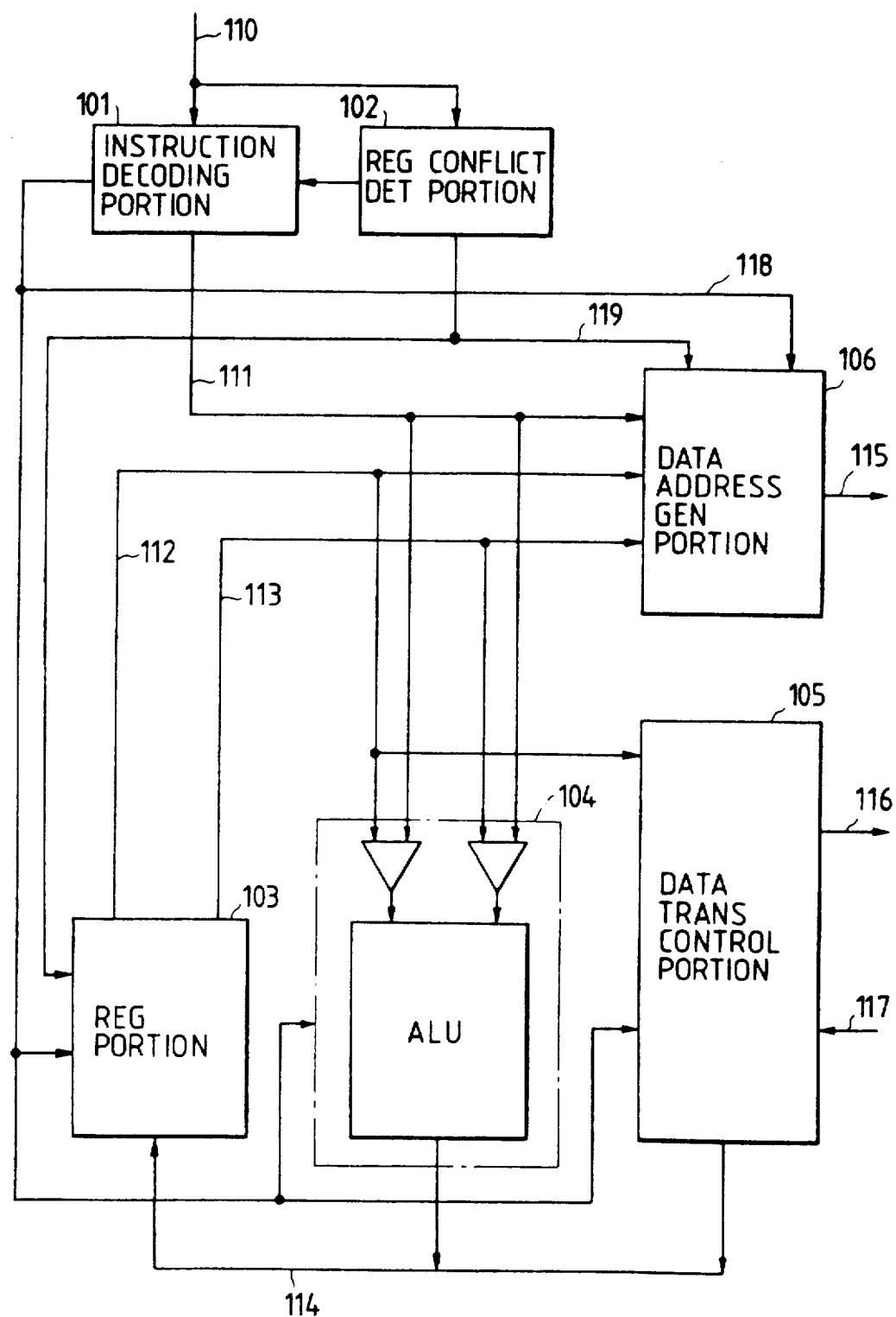
FIG. 1 is a schematic block diagram for showing an information processor embodying the present invention.

FIG. 1 is a schematic block diagram for showing an information processor embodying the present invention. In this figure, reference numeral 101 represents an instruction decoding portion for decoding an instruction; 102 a register conflict detecting portion for detecting a register conflict occurring between two registers respectively used by two instructions to successively be executed; 103 a register portion comprised of a plurality of registers including "0 register" which holds 32-bit zero data; 104 an integer arithmetic portion; 105 a data transfer control portion for controlling transfer of data between the instruction decoding portion 101 and data cache (not shown); 106 a data address generating portion for generating data addresses; 110 an instruction bus for transmitting instructions; 111 an immediate data bus for transmitting 32-bit immediate data; 112 a first internal data bus for transmitting 32-bit internal data; 113 a second internal data bus for transmitting 32-bit internal data; 114 a third internal data bus for transmitting 32-bit internal data; 115 a data address bus for transmitting 32-bit data addresses; 116 a store data bus for transferring 32-bit data to be stored in the data cache from the data transfer control portion 10-0 to the data cache; 117 a load data bus for transferring 32-bit data to be loaded from the data cache to the data transfer control portion 105; 118 control signals sent from the instruction decoding portion 101 to the data address generating portion 501; and 119 a register conflict detecting signal issued from the register conflict detecting portion.

Figure 2:
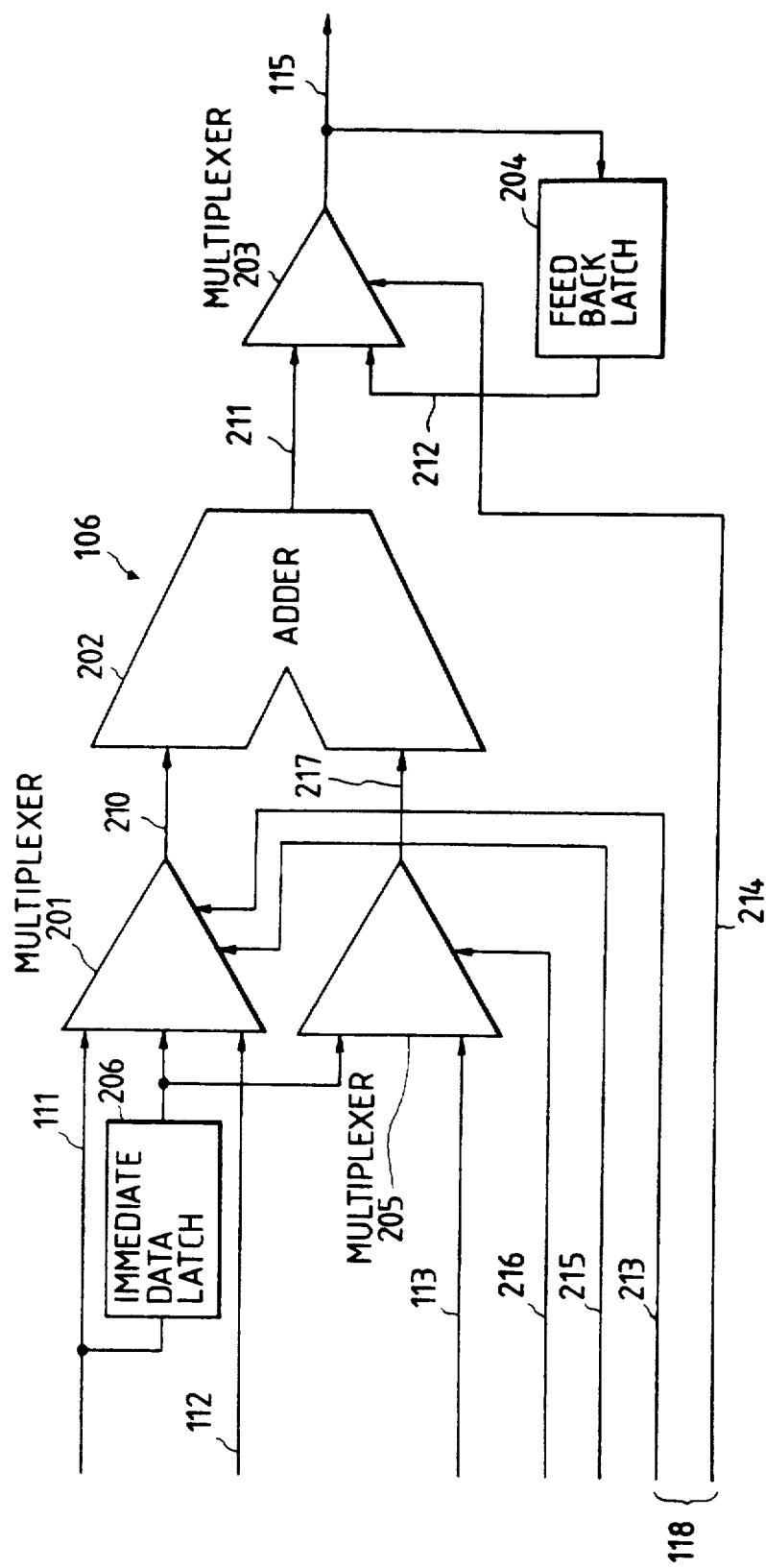
FIG. 2 is a schematic block diagram for showing a data address generating portion of the information processor of FIG. 1.

FIG. 2 is a schematic block diagram for showing internal structure of the data address generating portion 106 of the embodiment of FIG. 1. In FIG. 2, reference numerals 201, 203 and 205 designate 32-bit multiplexers; 202 a 32-bit adder; 204 a 32-bit feed back latch; and 206 a 32-bit immediate data latch. Further, reference numerals 111, 112 and 113 respectively indicate a 32-bit immediate data bus, a 32-bit first internal data bus and a 32-bit second internal data bus corresponding to the buses having the same names of FIG. 1. Moreover, reference numeral 210 indicates a data bus for transferring 32-bit data outputted from the multiplexer 201 to the adder 202; and 211 an addition result output bus for transmitting an output of the adder 202. Furthermore, reference numeral 115 represents the corresponding data address bus illustrated in FIG. 1. Further, reference numeral 212 represents a held data bus for transmitting data which is outputted to the data address bus 115 one clock cycle ago and then is held by the feed back latch 204; 213 a data selection signal, which is a part of the control signals 118 of FIG. 1, indicating a selection condition to be used in the multiplexer 201; and 214 an address holding signal, which is also a part of the control signal 118 of FIG. 1, indicating a selection condition to be used in the multiplexer 203. Moreover, reference numerals 215 represents a first register conflict detecting signal, which is a part of the register conflict detecting signals 119 of FIG. 1, indicating a selection condition to be used in the multiplexer 201; and 216 a second register conflict signal, which is also a part of the signals 119 of FIG. 1, indicating a selection condition to be used in the multiplexer 205. Furthermore, reference numeral 217 represents a 32-bit data bus for transferring an output of the multiplexer 205 to the adder 202.

Hereinafter, an operation of an information processor constructed as above described will be explained.

This information processor embodying the present invention is a pipeline consisting of four stages. Further, in this information processor, an operation is effected on only data stored in two 32-bit registers. Then, the results of the operation is stored again in the register. Further, in this information processor, data is transferred from (or to) a memory only to (or from) the registers. Furthermore, this information processor employs "load and store" architecture.

Additionally, in this information processor of the present invention, operations of executing an operation instruction, "one-cycle store" and "two-cycle store" instructions are effected in manners similar to those in the conventional information processor. Thus, detailed descriptions of the manners of executing an operation instruction, "one-cycle store" and "two-cycle store" instructions in this information processor are omitted.

Hereinafter, will be described an operation of the information processor embodying the present invention in case where an instruction for setting immediate data in a specific register and another instruction requiring calculation of memory addresses are successively executed. Especially, will be described an operation of the information processor in case where the instruction requiring calculation of memory addresses is "one-cycle store" instruction, "two-cycle store" instruction or a load instruction.

Figure 3:
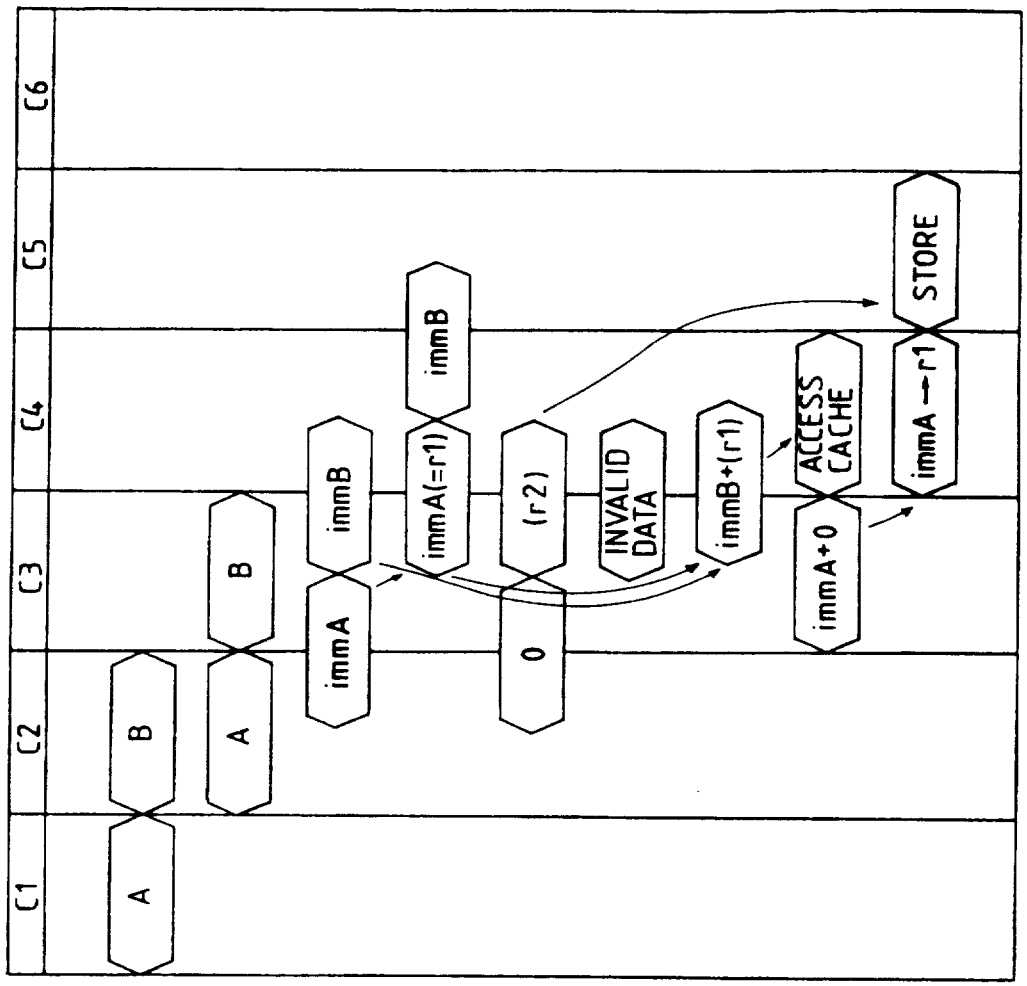
FIG. 3 is a timing chart for illustrating an operation of the information processor of FIG. 1 in case where an operation instruction for storing the immediate data in a specific register and a "one-cycle store" instruction are successively executed in this order and moreover a register conflict between a register to be used for calculation of memory addresses for execution of the store instruction and a register, in which immediate data should be set for execution of the operation instruction prior to the store instruction, occurs.
Figure 4:
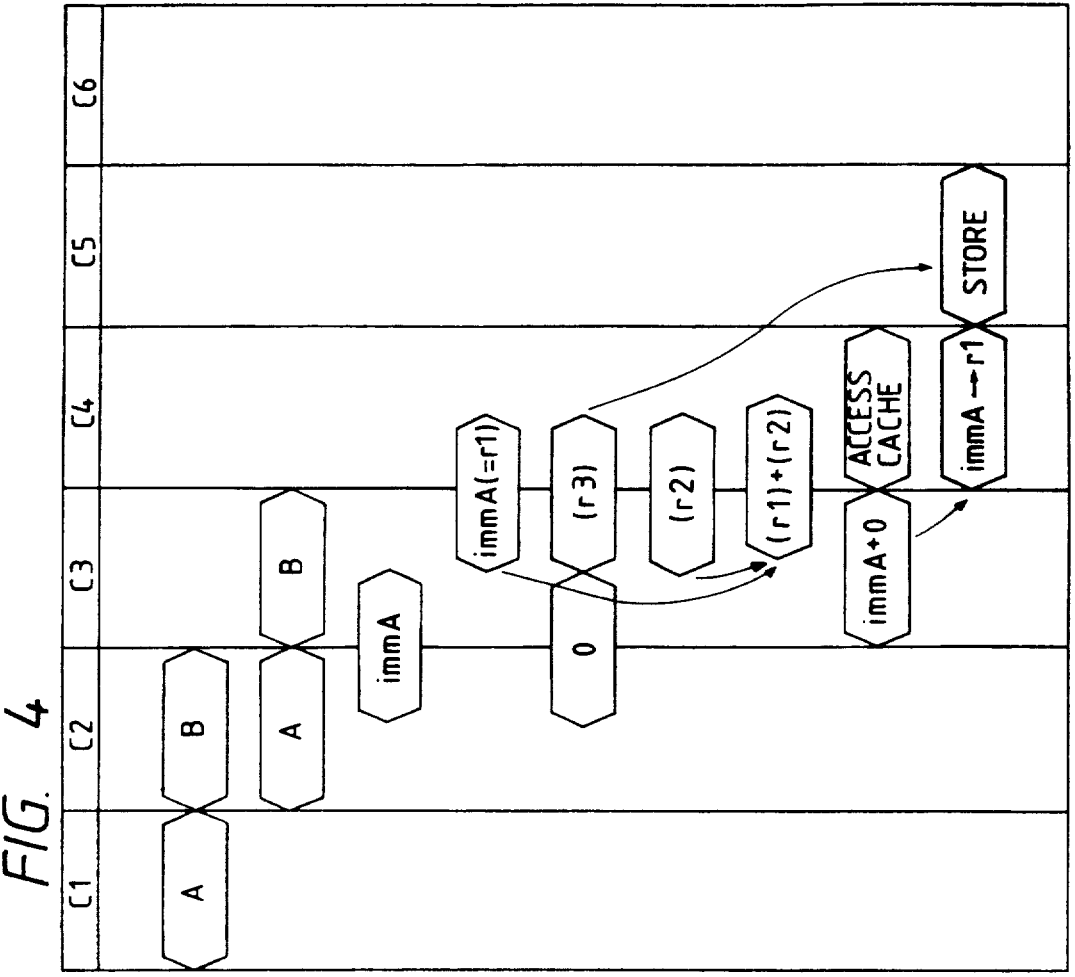
FIG. 4 is a timing chart for illustrating an operation of the information processor of FIG. 1 in case where an operation instruction for storing the immediate data in a specific register and a "two-cycle store" instruction are successively executed in this order and moreover a register conflict between a register to be used for calculation of memory addresses for execution of the store instruction and a register, in which immediate data should be set for execution of the operation instruction prior to the store instruction, occurs.
Figure 5:
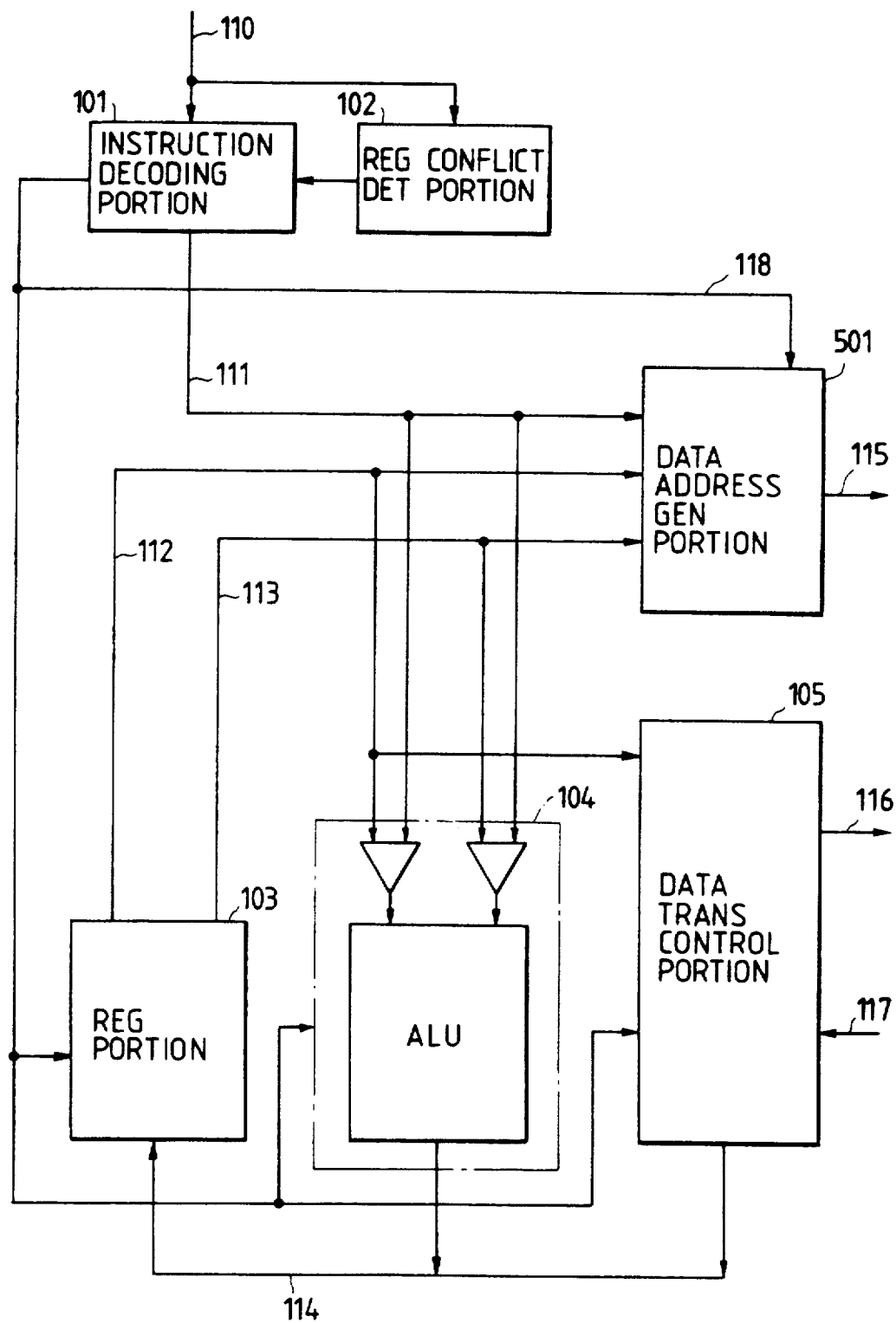
FIG. 5 is a schematic block diagram for showing a conventional information processor.
Figure 6:
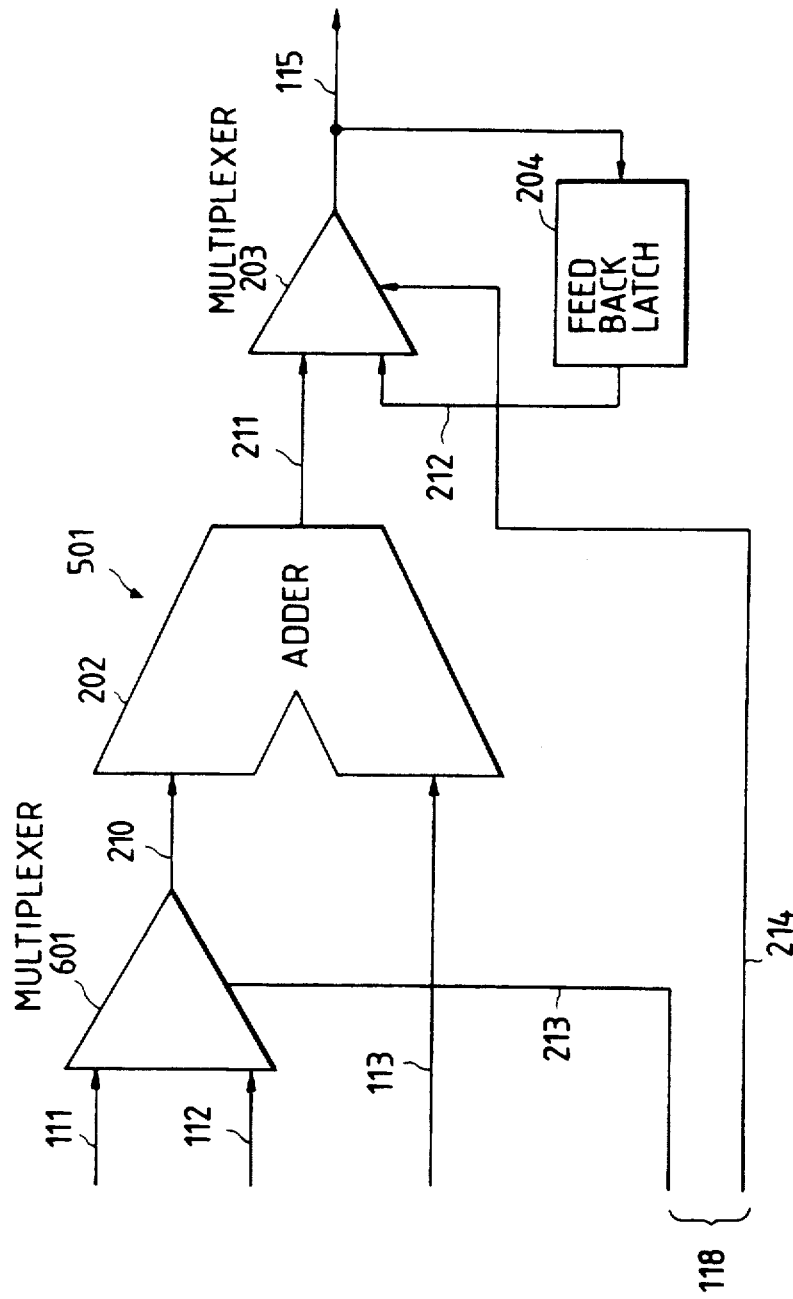
FIG. 6 is a schematic block diagram for showing a data address generating portion of the conventional information processor of FIG. 5.
Figure 7:
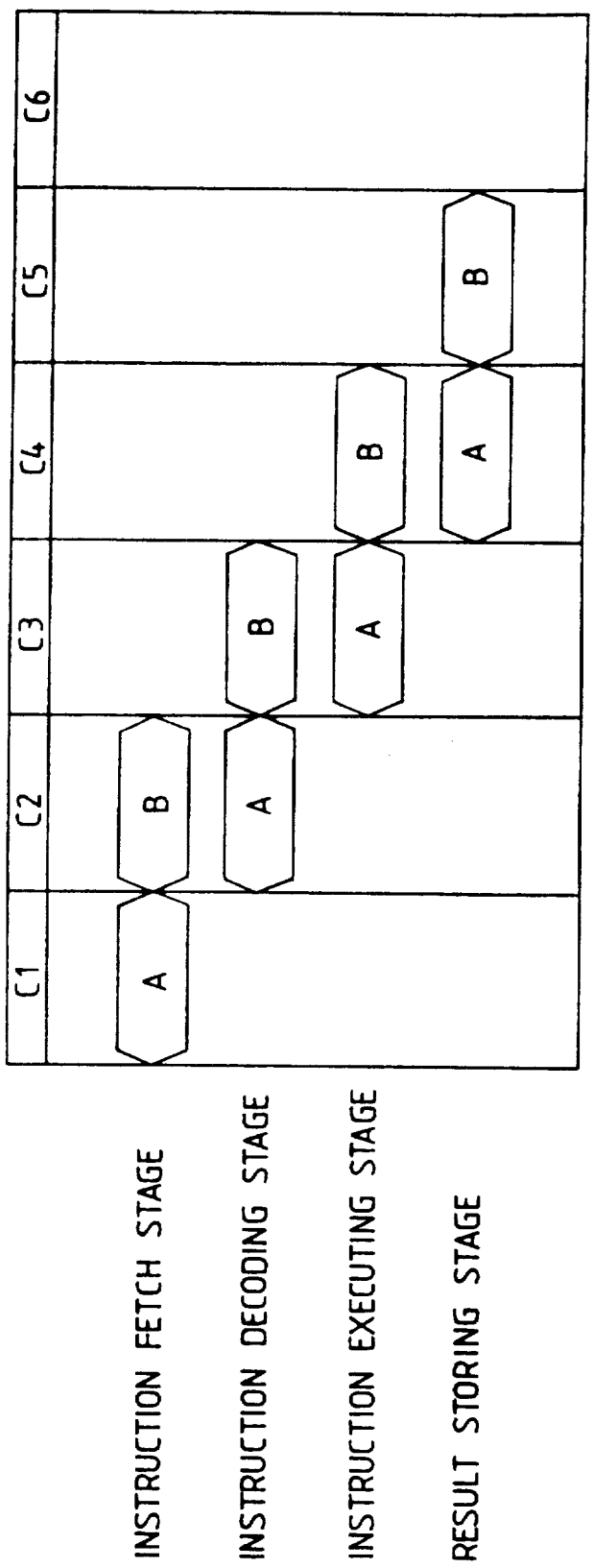
FIG. 7 is a timing chart for illustrating an operation of executing an operation instruction in the conventional information processor of FIG. 5.
Figure 8:
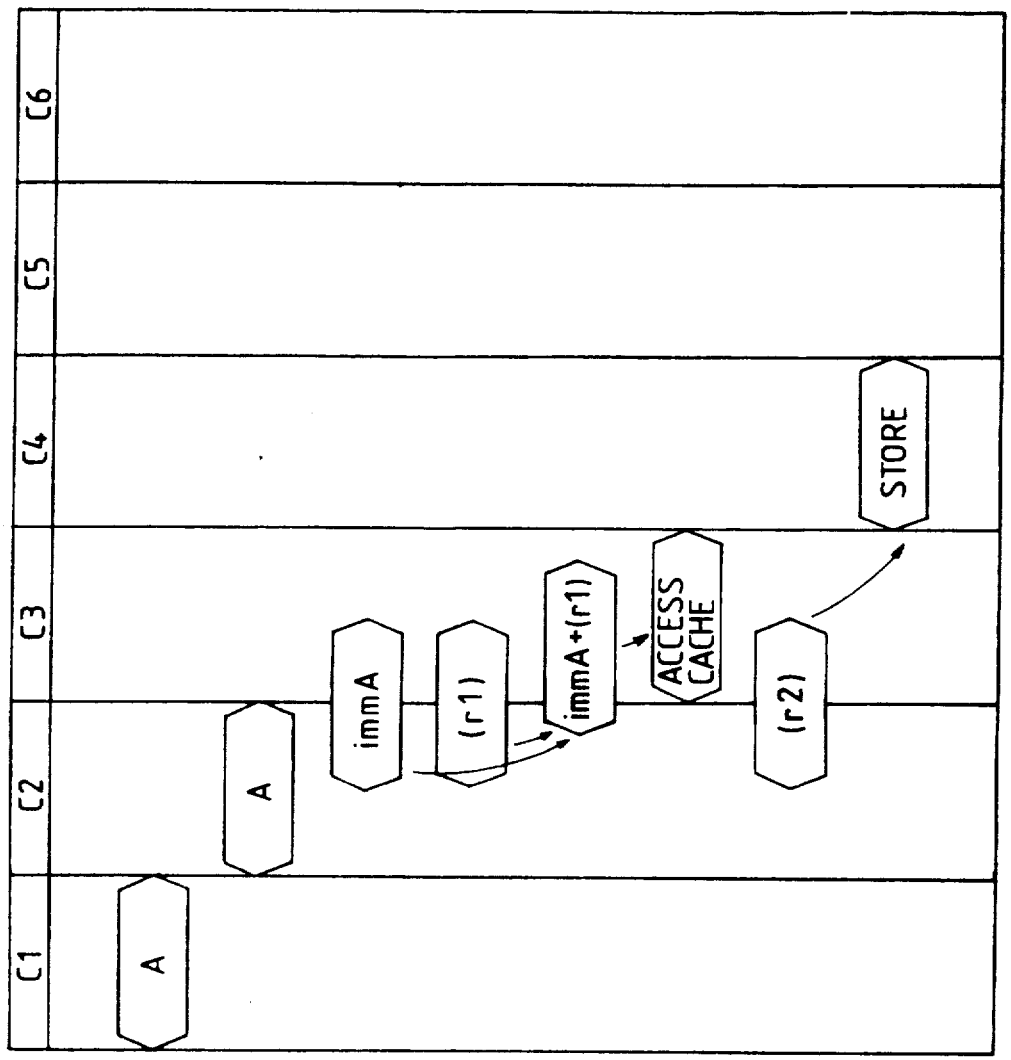
FIG. 8 is a timing chart for illustrating an operation of executing a "one-cycle store" instruction in the conventional information processor of FIG. 5.
Figure 9:
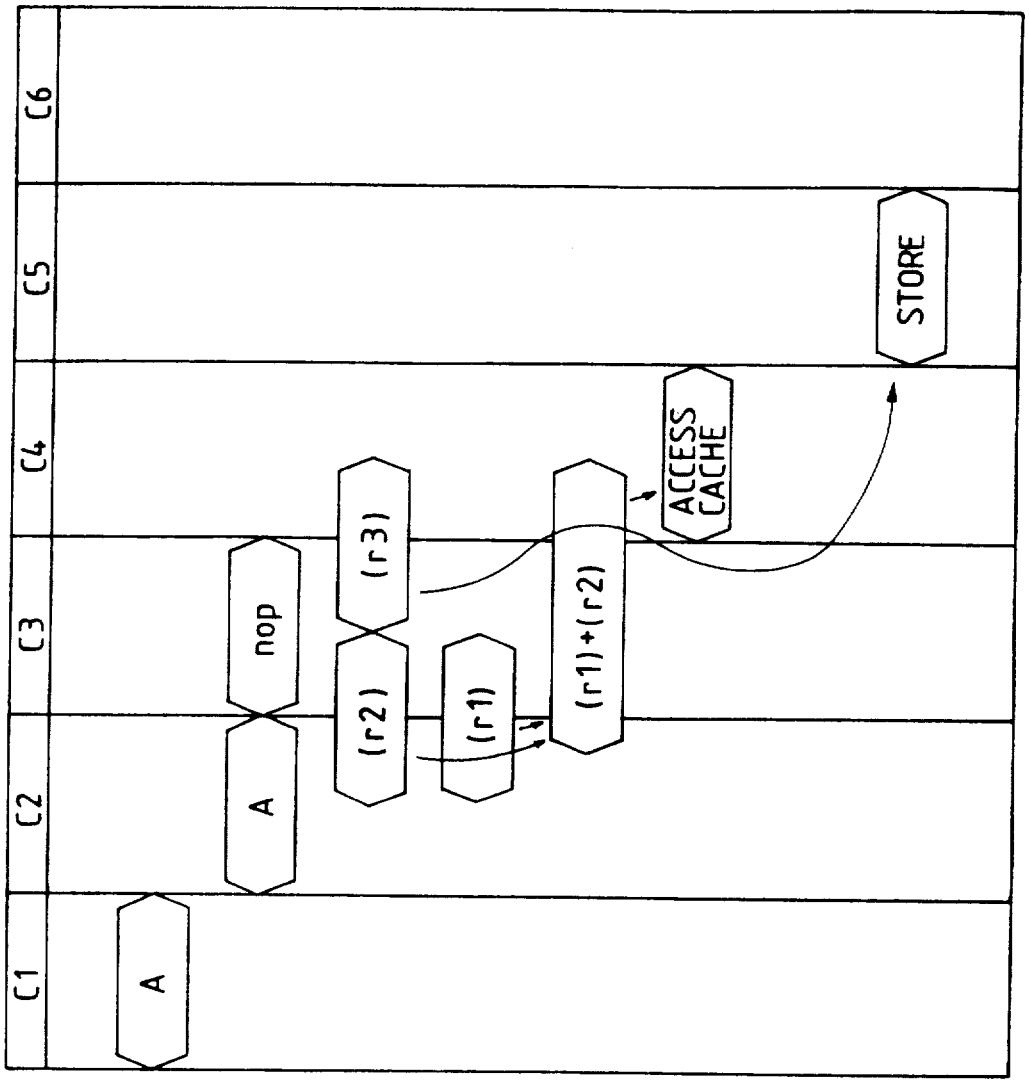
FIG. 9 is a timing chart for illustrating an operation of executing a "two-cycle store" instruction in the conventional information processor of FIG. 5.
Figure 10:
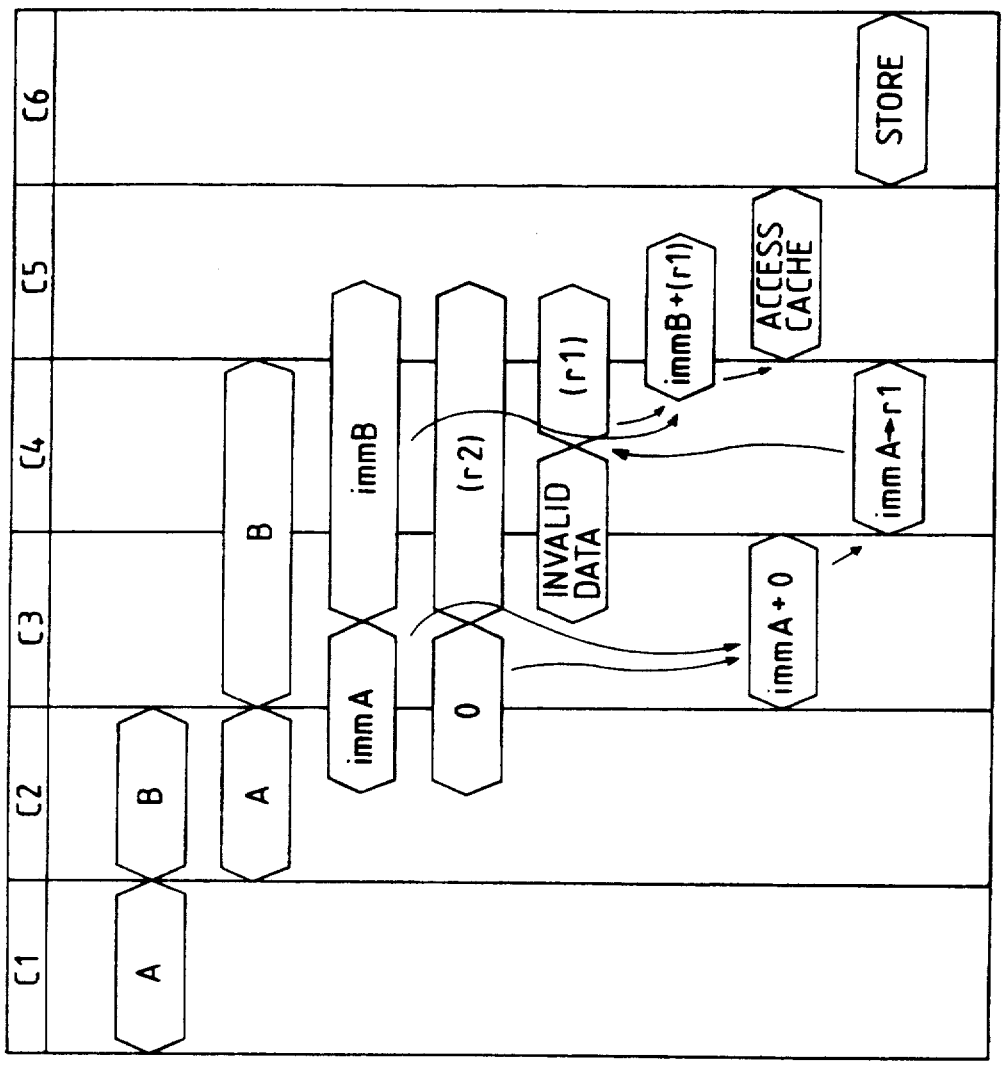
FIG. 10 is a timing chart for illustrating an operation of the the conventional information processor of FIG. 5 in case where an operation instruction for storing the immediate data in a specific register and a "one-cycle store" instruction are successively executed in this order and moreover a register conflict between a register to be used for calculation of memory addresses for execution of the store instruction and a register, in which immediate data should be set for execution of the operation instruction prior to the store instruction, occurs.
Figure 11:
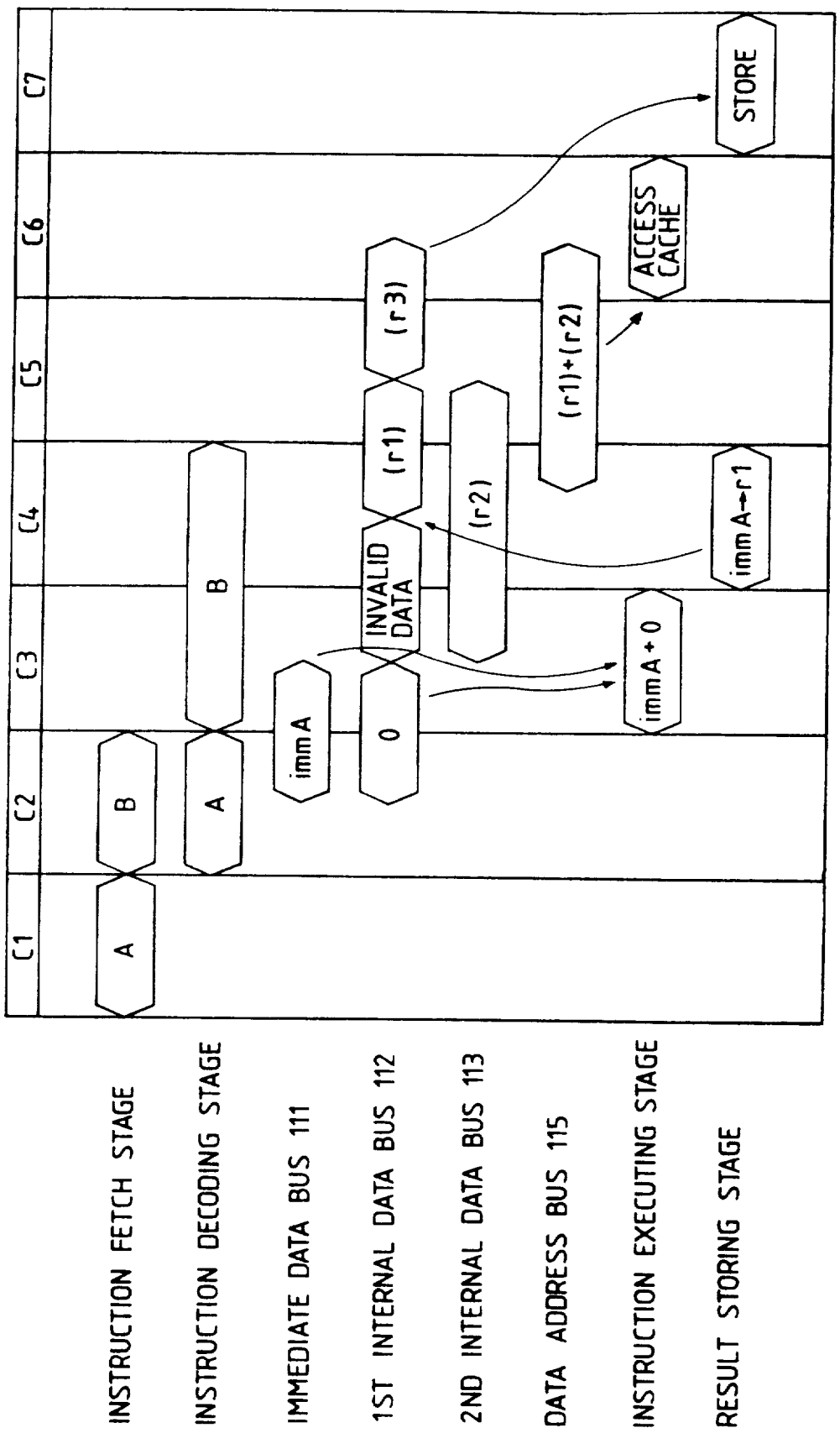
FIG. 11 is a timing chart for illustrating an operation of the the conventional information processor of FIG. 5 in case where an operation instruction for storing the immediate data in a specific register and a "two-cycle store" instruction are successively executed in this order and moreover a register conflict between a register to be used for calculation of memory addresses for execution of the store instruction and a register, in which immediate data should be set for execution of the operation instruction prior to the store instruction, occurs.

FIGS. 3 and 4 are timing charts for illustrating operations of the information processor embodying the present invention in case where an operation instruction A for storing the immediate data in a specific register and a store instruction B are successively executed in this order and moreover a register to be used for calculation of memory addresses for execution of the succeeding store instruction B agrees with a register, in which immediate data should be set for execution of the operation instruction A prior to the store instruction B (namely, a register conflict occurs). Especially, FIG. 3 is a timing chart for illustrating an operation of the embodiment in case where the store instruction B is "one-cycle store" instruction. Further, FIG. 4 is a timing chart for illustrating an operation of the embodiment in case where the store instruction B is "two-cycle store" instruction.

Figure 12:
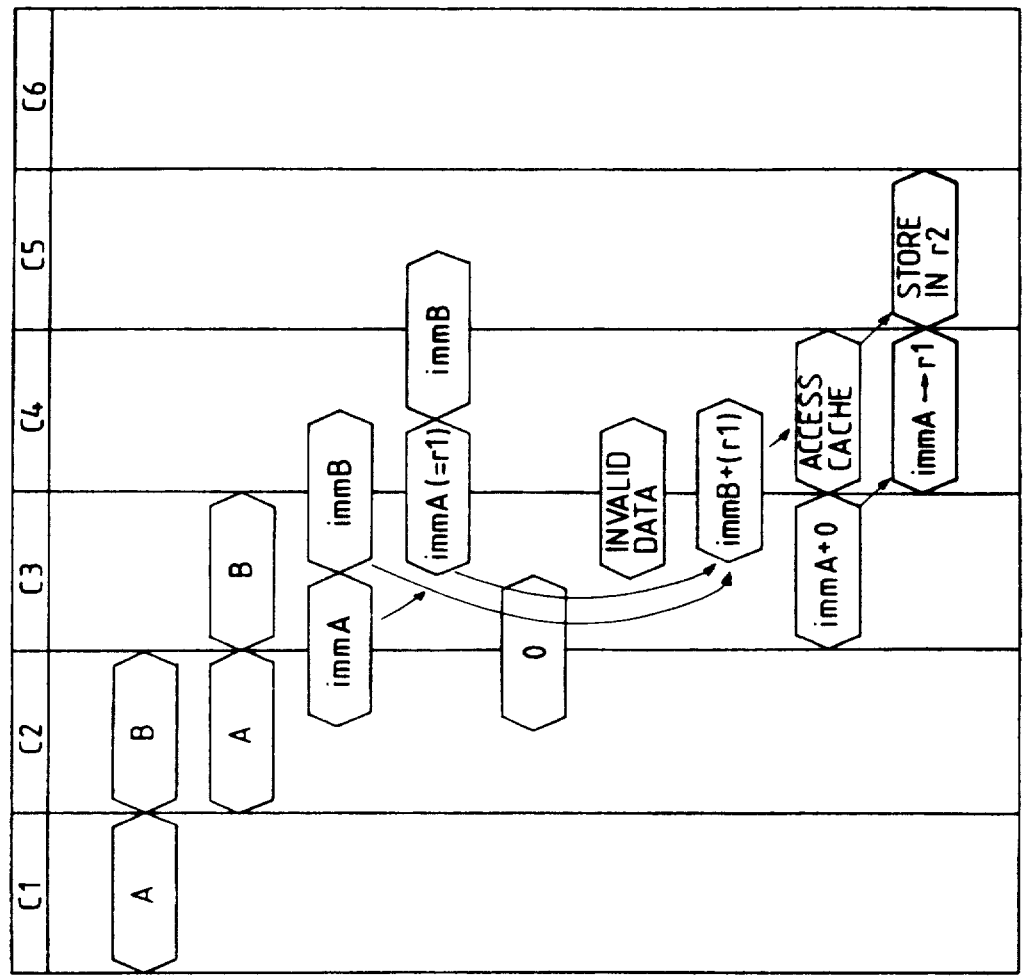
FIG. 12 is a timing chart for illustrating an operation of the conventional information processor of FIG. 5 in case where an operation instruction for storing the immediate data in a specific register and a load instruction are successively executed in this order and moreover a register conflict between a register to be used for calculation of memory addresses for execution of the load instruction and a register, in which immediate data should be set for execution of the operation instruction prior to the load instruction, occurs.

Further, FIG. 12 is a timing chart for illustrating an operation of the information processor embodying the present invention in case where an operation instruction A for storing the immediate data in a specific register and a load instruction B are successively executed in this order and moreover a register to be used for calculation of memory addresses for execution of the succeeding load instruction B agrees with a register, in which immediate data should be set for execution of the operation instruction A prior to the store instruction.

With reference to FIGS. 1, 2 and 3, will be described hereinbelow an operation of the embodiment in case where an operation instruction A for storing the immediate data in a specific register and a "one-cycle store" instruction B are successively executed in this order and moreover a register conflict between a register to be used for calculation of memory addresses for execution of the store instruction B and a register, in which immediate data should be set for execution of the operation instruction A prior to the store instruction B, occurs. For simplicity of description, let "r1" denote the register coming into conflict with the register in which the immediate data should be set; "(immA)" the immediate data set by the operation instruction A; "(immB)" the immediate data to be used for calculation of addresses required by the "one-cycle store" instruction B; and "(r2)" data, which is held in the register, to be stored in the memory, i.e., the data cache.

First, in C1 Cycle, (1) the processing of the operation instruction A is as follows. Namely, the operation instruction A is fetched and further is sent to the instruction bus 110.

Then, in C2 Cycle, (1) the processing of the operation instruction A is as follows. Namely, the operation instruction A sent out to the instruction bus 110 is decoded by the instruction decoding portion 101. The instruction decoding portion 101 sends out the control signal 118 representing control information to the data address generating portion 106 and further outputs the immediate data (immA) to the immediate data bus 111. Moreover, the register portion 103 sends out data, which is held in the 32-bit "0 register" indicated by the control signal 118, to the first internal data bus 112.

On the other hand, (2) the processing of the store instruction B is as follows. Namely, the store instruction B is fetched and is then sent out to the instruction bus 110.

Further, in C3 Cycle, (1) the processing of the operation instruction A is as follows. Namely, the immediate data (immA), which is sent out by the instruction decoding portion 101 to the immediate data bus 111, is inputted to the integer arithmetic portion 104. Further, the integer arithmetic portion 104 performs an addition of this input data and 0 sent out by the register portion 103 to the first internal data bus 112. Upon completion of this addition, the integer arithmetic portion 104 outputs results of the addition to the 32-bit third internal data bus 114. Simultaneously, the immediate data (immA) sent out by the instruction decoding portion 101 in C2 Cycle to the immediate data bus 111 is latched by the 32-bit immediate data latch 206.

On the other hand, (2) the processing of the store instruction B is as follows. That is, the store instruction B sent to the instruction bus 110 is first decoded by the instruction decoding portion 101. Then, the instruction decoding portion 101 outputs the control signal 118 representing control information to the data address generating portion 106 and also outputs immediate data (immB) to the immediate data bus 111. Further, in parallel with the processing by the instruction decoding portion 101, the register conflict detecting portion 102 detects a register conflict between the register r1 to be used to calculate memory addresses for execution of the store instruction B and the register r1 in which the immediate data used for execution of the operation instruction A prior to the store instruction B should be set. Then, the register conflict detecting portion 102 sends out a register conflict detecting signals 119. At that time, the second register conflict detecting signal 216 of the register conflict detecting signals 119 is used as a signal for making the multiplexer 205 select an output of the immediate data latch 206. Furthermore, the register portion 103 sends out the data (r1), which is used for calculation of memory addresses and is held in the 32-bit register indicated by the control signal 118, to the second internal data bus 113 and also sends out the data (r2), which should be stored in a memory and is held in the 32-bit register, to the first internal data bus 112. Incidentally, the data (r1) transmitted on the second internal data bus 113 is invalid data because the execution of the operation instruction A is not completed.

Next, an operation of the data address generating portion 106 will be described hereinbelow.

First, the multiplexer 201 outputs the immediate data (immB) transmitted on the immediate data bus 111 to the data bus 210 in accordance with the information represented by the data selection signal 213 which is outputted as the control signal 118. The multiplexer 205 outputs the data (immA), which corresponds to correct data (r1) and is latched by the immediate data latch 206, to the data bus 217 in accordance with the information represented by the second register conflict detecting signal 216. The adder 202 adds the data outputted to the 32-bit data bus 210 and that outputted to the 32-bit data bus 217 and outputs results of the addition to the addition result output bus 211. Then, the multiplexer 203 outputs the data, which is transmitted on the addition result output bus 211, to the data address bus 115 in accordance with information represented by the address holding signal 214 which is sent out as the control signal 118. Thus, an address {(immB)+(r1)} at which the data should be stored is sent out to the data address bus 115.

Further, in C4 Cycle, (1) the processing of the operation instruction A is as follows. The immediate data (immA) sent out by the integer arithmetic portion 104 in C3 Cycle to the third internal data bus 114 is stored in the register r1 indicated by the control signal 118 in C2 Cycle.

Additionally, (2) the processing of the store instruction B is as follows. Namely, the data cache is accessed by using the address {(immB)+(r1)} sent to the data address bus 115. Here, it is assumed that the data cache is hit. Furthermore, the data transfer control portion 105 latches the data (r2) outputted to the first internal data bus 112.

Then, in C5 Cycle, the data transfer control portion 105 sends out the data (r2) latched in C4 CYcle to the store data bus 116 and further the data (r2) is stored in the data cache.

As described above, in this embodiment, in case where an operation instruction A for setting immediate data in a specific register and a "one-cycle store" instruction are successively executed in this order and moreover a register conflict occurs between a register to be used for execution of the "one-cycle store" instruction B requiring calculation of memory addresses and a register, in which immediate data should be set, to be used for execution of the operation instruction A prior to the execution of the instruction B, the processing can be faster effected by a period of one clock cycle in comparison with the conventional information processor by being provided with an immediate data latch 206 and controlling the multiplexer 205 in accordance with the register conflict detecting signal 119.

Next, with reference to FIGS. 1, 2 and 4, will be described hereinbelow an operation of the embodiment in case where an operation instruction A for storing the immediate data in a specific register and a "two-cycle store" instruction B are successively executed in this order and moreover a register conflict between a register to be used for calculation of memory addresses for execution of the store instruction B and a register, in which immediate data should be set for execution of the operation instruction A prior to the store instruction B, occurs. For simplicity of description, let "(r1)" and "(r2)" denote data held in the registers required for calculation of addresses at the time of execution of a "two-cycle store" instruction; "(r3)" data, which is held in the register, to be stored in the memory, i.e., the data cache; "r1" the register coming into conflict with the register in which the immediate data should be set; and "(immA)" the immediate data set by the operation instruction A.

First, in C1 Cycle, (1) the processing of the operation instruction A is effected as follows. Namely, the operation instruction A is fetched and further is sent to the instruction bus 110.

Then, in C2 Cycle, (1) the processing of the operation instruction A is as follows. Namely, the operation instruction A sent out to the instruction bus 110 is decoded by the instruction decoding portion 101. The instruction decoding portion 101 sends out the control signal 118 representing control information to the data address generating portion 106 and further outputs the immediate data (immA) to the immediate data bus 111. Moreover, the register portion 103 sends out data, which is held in the 32-bit "0 register" indicated by the control signal 118, to the first internal data bus 112.

Further, (2) the processing of the store instruction B is effected as follows. Namely, the store instruction B is fetched and is then sent out to the instruction bus 110.

Moreover, in C3 Cycle, (1) the processing of the operation instruction A is effected as follows. Namely, the immediate data (immA), which is sent out by the instruction decoding portion 101 to the immediate data bus 111, is inputted to the integer arithmetic portion 104. Further, the integer arithmetic portion 104 performs an addition of this input data and 0 sent out by the register portion 103 to the first internal data bus 112. Upon completion of this addition, the integer arithmetic portion 104 outputs results of the addition to the 32-bit third internal data bus 114. Simultaneously, the immediate data (immA) sent out by the instruction decoding portion 101 in C2 Cycle to the immediate data bus 111 is latched by the 32-bit immediate data latch 206.

Furthermore, (2) the processing of the store instruction B is effected as follows. That is, the store instruction B sent to the instruction bus 110 is first decoded by the instruction decoding portion 101. Then, the instruction decoding portion 101 outputs the control signal 118 representing control information to the data address generating portion 106. Further, in parallel with the processing by the instruction decoding portion 101, the register conflict detecting portion 102 detects a register conflict between the register r1 to be used to calculate memory addresses for execution of the store instruction B and the register r1 in which the immediate data used for execution of the operation instruction A prior to the store instruction B should be set. Then, the register conflict detecting portion 102 outputs a register conflict detecting signals 119. At that time, the second register conflict detecting signal 215 of the register conflict detecting signals 119 is outputted as a signal for making the multiplexer 201 select an output of the immediate data latch 206. Moreover, the register conflict detecting portion 102 outputs a signal for making the register portion 103 output the 32-bit data (r3), which should be stored in a memory and is held in a register, to the first internal data bus 112. Furthermore, the register portion 103 sends out the data (r2), which is used for calculation of memory addresses and is held in the 32-bit register indicated by the control signal 118, to the second internal data bus 113.

Next, an operation of the data address generating portion 106 will be described hereinbelow.

First, the multiplexer 201 outputs the immediate data (immA) (corresponding to correct data (r1) latched by the immediate data latch 206 to the data bus 210 in accordance with the information represented by the first register conflict detecting signal 215. The multiplexer 205 outputs the data r2 to the data bus 217 in accordance with the information represented by the second register conflict detecting signal 216. The adder 202 adds the data outputted to the 32-bit data bus 210 and that outputted to the 32-bit data bus 217 and outputs results of the addition to the addition result output bus 211. Then, the multiplexer 203 outputs the data, which is transmitted on the addition result output bus 211, to the data address bus 115 in accordance with information represented by the address holding signal 214 which is sent out as the control signal 118. Thus, an address {(r1)+(r2)} at which the data should be stored is sent out to the data address bus 115.

Further, in C4 Cycle, (1) the processing of the operation instruction A is effected as follows. The immediate data (immA) sent out by the integer arithmetic portion 104 in C3 Cycle to the third internal data bus 114 is stored in the register r1 indicated by the control signal 118 in C2 Cycle.

Additionally, (2) the processing of the store instruction B is as follows. Namely, the data cache is accessed by using the address {(r1)+(r2)} sent to the data address bus 115. Here, it is assumed that the data cache is hit. Furthermore, the data transfer control portion 105 latches the data (r3) outputted to the first internal data bus 112.

Then, in C5 Cycle, the following processing of the store instruction B is effected. That is, the data transfer control portion 105 sends out the data (r3) latched in C4 Cycle to the store data bus 116 and further the data (r3) is stored in the data cache.

As described above, in this embodiment, in case where an operation instruction A for setting immediate data in a specific register and a "two-cycle store" instruction are successively executed in this order and moreover a register conflict occurs between a register to be used for execution of the "two-cycle store" instruction B requiring calculation of memory addresses and a register, in which immediate data should be set, to be used for execution of the operation instruction A prior to the execution of the instruction B, the processing can be faster effected by a period of two clock cycles in comparison with the conventional information processor by being provided with an immediate data latch 206 and controlling the multiplexer 205 in accordance with the register conflict detecting signal 119.

Finally, by referring to FIGS. 1, 2 and 12, will be described hereinbelow an operation of the embodiment in case where an operation instruction A for storing the immediate data in a specific register and a load instruction B are successively executed in this order and moreover a register conflict between a register to be used for calculation of memory addresses for execution of the load instruction B and a register, in which immediate data should be set for execution of the operation instruction A prior to the load instruction B, occurs. For simplicity of description, let "r1" denote the register coming into conflict with the register in which the immediate data should be set; "(immA)" the immediate data set by the operation instruction A; "(immB)" the immediate data to be used for calculation of addresses required by the load instruction B; and "r2" the register, to which data should be loaded.

First, in C1 Cycle, (1) the processing of the operation instruction A is as follows. Namely, the operation instruction A is fetched and further is sent to the instruction bus 110.

Then, in C2 Cycle, (1) the processing of the operation instruction A is as follows. Namely, the operation instruction A sent out to the instruction bus 110 is decoded by the instruction decoding portion 101. The instruction decoding portion 101 sends out the control signal 118 representing control information to the data address generating portion 106 and further outputs the immediate data (immA) to the immediate data bus 111. Moreover, the register portion 103 sends out data, which is held in the 32-bit "0 register" indicated by the control signal 118, to the first internal data bus 112.

On the other hand, (2) the processing of the load B is as follows. Namely, the load instruction B is fetched and is then sent out to the instruction bus 110.

Further, in C3 Cycle, (1) the processing of the operation instruction A is as follows. Namely, the immediate data (immA), which is sent out by the instruction decoding portion 101 to the immediate data bus 111, is inputted to the integer arithmetic portion 104. Further, the integer arithmetic portion 104 performs an addition of this input data and 0 sent out by the register portion 103 to the first internal data bus 112. Upon completion of this addition, the integer arithmetic portion 104 outputs results of the addition to the 32-bit third internal data bus 114. Simultaneously, the immediate data (immA) sent out by the instruction decoding portion 101 in C2 Cycle to the immediate data bus 111 is latched by the 32-bit immediate data latch 206.

On the other hand, (2) the processing of the load instruction B is as follows. That is, the load instruction B sent to the instruction bus 110 is first decoded by the instruction decoding portion 101. Then, the instruction decoding portion 101 outputs the control signal 118 representing control information to the data address generating portion 106 and also outputs immediate data (immB) to the immediate data bus 111. Further, in parallel with the processing by the instruction decoding portion 101, the register conflict detecting portion 102 detects a register conflict between the register r1 to be used to calculate memory addresses for execution of the load instruction B and the register r1 in which the immediate data used for execution of the operation instruction A prior to the load instruction B should be set. Then, the register conflict detecting portion 102 sends out a register conflict detecting signals 119. At that tune, the second register conflict detecting signal 216 of the register conflict detecting signals 119 is used as a signal for making the multiplexer 205 select an output of the immediate data latch 206. Furthermore, the register portion 103 sends out the data (r1), which is used for calculation of memory addresses and is held in the 32-bit register indicated by the control signal 118, to the second internal data bus 113. Incidentally, the data (r1) held in the 32-bit register is invalid data because the execution of the operation instruction A is not completed.

Next, an operation of the data address generating portion 106 will be described hereinbelow.

First, the multiplexer 201 outputs the immediate data (immB) transmitted on the immediate data bus 111 to the data bus 210 in accordance with the information represented by the data selection signal 213 which is outputted as the control signal 118. The multiplexer 205 outputs the data (immA), which corresponds to correct data (r1) and is latched by the immediate data latch 206, to the data bus 217 in accordance with the information represented by the second register conflict detecting signal 216. The adder 202 adds the data outputted to the 32-bit data bus 210 and that outputted to the 32-bit data bus 217 and outputs results of the addition to the addition result output bus 211. Then, the multiplexer 203 outputs the data, which is transmitted on the addition result output bus 211, to the data address bus 115 in accordance with information represented by the address holding signal 214 which is sent out as the control signal 118. Thus, an address {(immB)+(r1} at which the data should be stored is sent out to the data address bus 115.

Further, in C4 Cycle, (1) the processing of the operation instruction A is as follows. The immediate data (immA) sent out by the integer arithmetic portion 104 in C3 Cycle to the third internal data bus 114 is stored in the register r1 indicated by the control signal 118 in C2 Cycle.

Additionally, (2) the processing of the store instruction B is as follows. Namely, the data cache is accessed by using the address {(immB)+(r1)} sent to the data address bus 115. Here, it is assumed that the data cache is hit. Furthermore, the data cache outputs the data stored at the hit address {(immB)+(r1)} to the load data bus 117.

Then, in C5 Cycle, the data transfer control portion 105 sends out the data, which is sent by the data cache to the load data bus 117 in C4 Cycle, to the third internal data bus 114. Further, the register portion 103 causes the register r2 having the address represented by the control signal 118 to store the data transmitted on the third internal data bus 114.

Incidentally, an operation of the information processor in case where an address of data to be loaded by executing the load instruction is represented by {(r1)+(r2)} is similar to the operation of the information processor in case where an address of data to be loaded by executing the "load" instruction is represented by {(r1)+(immB)} with the exception that data held in the two registers to be used by the register portion 103 to calculate addresses are respectively outputted to the first internal data bus and the second internal data bus and th data address generating portion 106 outputs the data transmitted on the first internal data bus to the data bus 210. Thus, detailed description of the operation of the information processor in case where an address of data to be loaded by executing the load instruction is represented by {(r1)+(r2)} is omitted.

As described above, in this embodiment, in case where an operation instruction A for setting immediate data in a specific register and a load instruction B are successively executed in this order and moreover a register conflict between a register to be used for execution of the load instruction B requiring calculation of memory addresses and a register, in which immediate data should be set, to be used for execution of the operation instruction A prior to the execution of the instruction B, the processing can be faster effected by a period of one clock cycle in comparison with the conventional information processor by being provided with an immediate data latch 206 and controlling the multiplexer 205 in accordance with the register conflict detecting signal 119.

While a preferred embodiment of the present invention has been described above, it is to be understood that the present invention is not limited thereto. For example, in the foregoing description of the embodiment of the present invention, a "one-cycle store" instruction, a "two-cycle store" instruction and a load instruction have been cited as an instruction requiring calculation of memory addresses. In cases of other instructions requiring calculation of memory addresses such as a branch instruction, the information processor can perform the processing faster than the conventional information processor by a period of one clock cycle by controlling the information processor similarly as in cases of a "one-cycle store" instruction, a "two-cycle store" instruction and a load instruction.

Further, it is to be understood that other modifications will be apparent to those skilled in the art without departing from the spirit of the invention.

The scope of the present invention, therefore, is to be determined solely by the appended claims.

What is claimed is:

1. An information processor connected to a memory, said information processor comprising:

an immediate data latch for latching and holding immediate data indicated by each instruction;

two multiplexers each for receiving an output of the immediate data latch;

an adder for adding outputs of said two multiplexers;

a register conflict detecting portion for detecting occurrence of a register conflict during execution of first and second instructions which should be successively executed and outputting register conflict detecting signals to said multiplexers when detecting occurrence of a register conflict; and a register portion having a plurality of registers for simultaneously outputting data held in two registers, wherein the first instruction is an instruction for storing first immediate data in a first register, and the second instruction is an instruction for calculating addresses of said memory by adding data held in a second register and data held in a third register and storing data held in a fourth register at the calculated addresses of the memory, and wherein when said register conflict detecting portion detects a register conflict by determining that one of the second and third registers to be used for the calculation of addresses required by the second instruction is the first register in which the first immediate data is stored, said register portion outputs the data held in either the second or third registers and the data held in the fourth register and moreover said adder calculates the addresses by adding the first immediate data, which has been latched and held by said immediate data latch and is then outputted from one of said multiplexers in response to a register conflict detecting signal, and the data held in either the second or third registers which is not the first register and is outputted from the other of said multiplexers in response to a register conflict detecting signal.

2. An information processor as set forth in claim 1, wherein the instruction requiring calculation of addresses in the memory is a load instruction.

3. An information processor as set forth in claim 1, wherein the instruction requiring calculation of addresses in the memory is a store instruction.

4. An information processor as set forth in claim 1, wherein the instruction requiring calculation of addresses in the memory is a branch instruction.

* * * * *